Sept. 9, 1941.   J. W. OLSON   2,255,436
COATING APPARATUS AND METHOD OF OPERATION
Filed Sept. 19, 1939   2 Sheets-Sheet 1

INVENTOR
JOHN W. OLSON
BY
ATTORNEY

Patented Sept. 9, 1941

2,255,436

UNITED STATES PATENT OFFICE 2,255,436

COATING APPARATUS AND METHOD OF OPERATION

John W. Olson, Hastings on Hudson, N. Y., assignor to Anaconda Wire & Cable Company, New York, N. Y., a corporation of Delaware Application September 19, 1939, Serial No. 295,575

10 Claims. (Cl. 91—18)

The present invention relates to apparatus for coating filaments and more particularly to that type of apparatus which is designed for the application of bituminous or thermo-plastic preparations.

In the manufacture of electrical wires and cables a wide variety of insulated conductors are finished with bituminous compounds which of course are extremely resistant to weathering and, at the same time, have some degree of dielectric strength. Both "weatherproof" wire, which consists of a plurality of braids of cotton or similar fibrous material saturated and finished with asphaltic compounds, and rubber covered building wire, which carries a layer of flame-retardant bituminous material over the rubber, are typical.

The usual method of applying these coatings is to wrap the wire to be treated about a drum which is partially submerged in molten compound. In more recent types of equipment the point of application of the compound is above the general level of the molten material, being raised by a pump or wheel, so that the wire is not immersed in the body of the molten material but merely passes under a stream of compound. The advantage of this lies in ease of "stringing up" and less hazard to the operator. All types, however, suffer from a serious disadvantage in that the entire body of the compound is maintained at the temperature of application. In the case of asphalts or pitches this is a serious disadvantage as the temperatures of application may be quite high, often as much as 500° F., and at such heats the compound will be oxidized because of its exposure to the air and its physical characteristics will therefore undergo considerable change, the material tending to thicken or "liver." A compound which has been blended with particular care for a specific application may be totally unsuitable for that use after it has been exposed to the air at a high temperature for several hours. The large amount of heat which is wasted and the fumes which are released into the atmosphere are practical considerations of no small importance.

The chief purpose of this invention is to provide apparatus for the application of thermoplastic compounds whereby the greater part of the compound is maintained at a temperature just above its melting point, while a comparatively small quantity is heated to the temperature of application. A further feature of this invention lies in the fact that the compound which is heated to a high temperature need not be permitted to come in contact with the air and hence even this small amount of material is not permitted to oxidize. Other features and advantages of the present invention will be apparent from the following description when read in connection with the accompanying drawings, in which similar reference numerals denote similar parts and in which:

Figure 1:
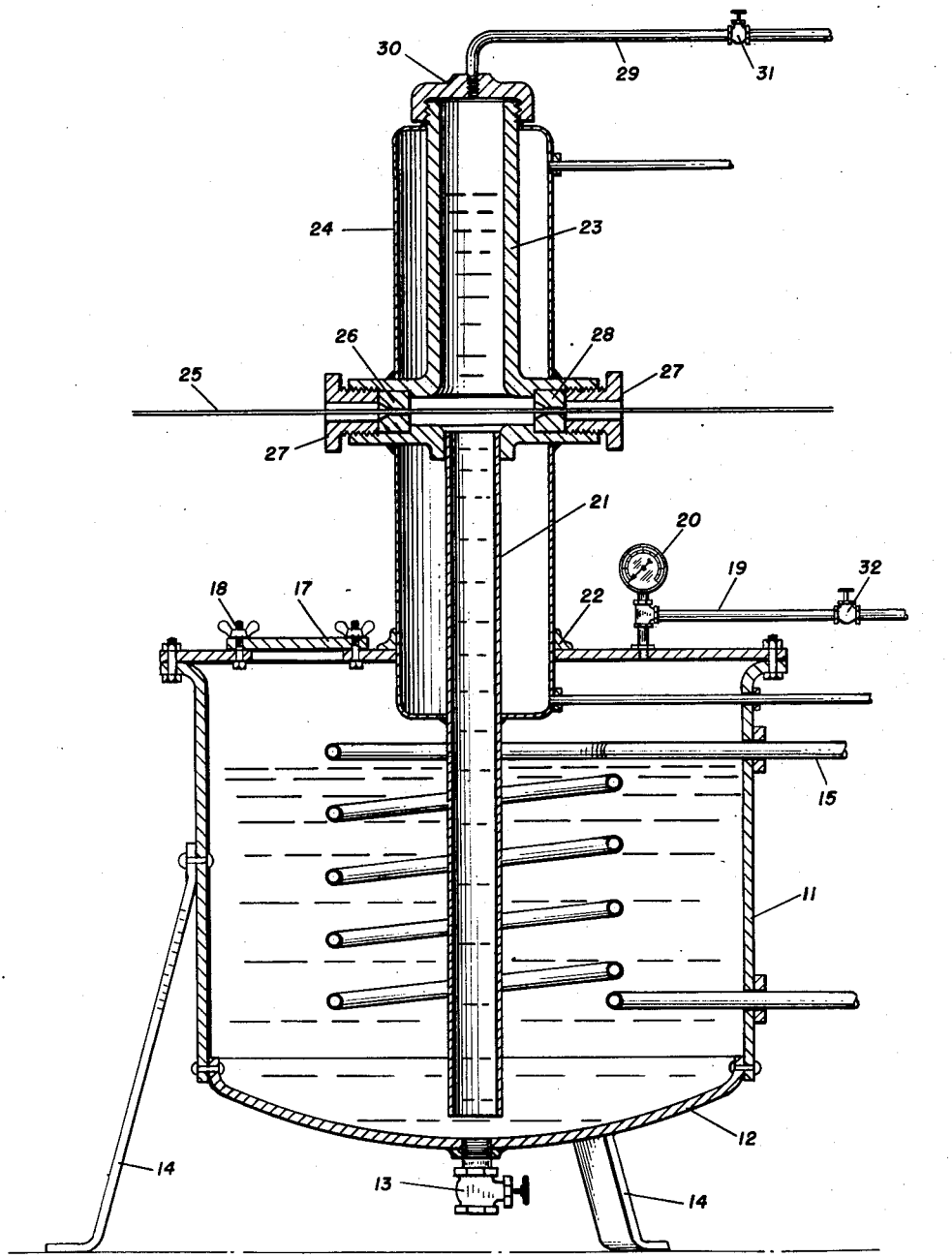
Figure 1 is a cross-sectional elevation of coating apparatus made in accordance with the present invention.
Figure 2:
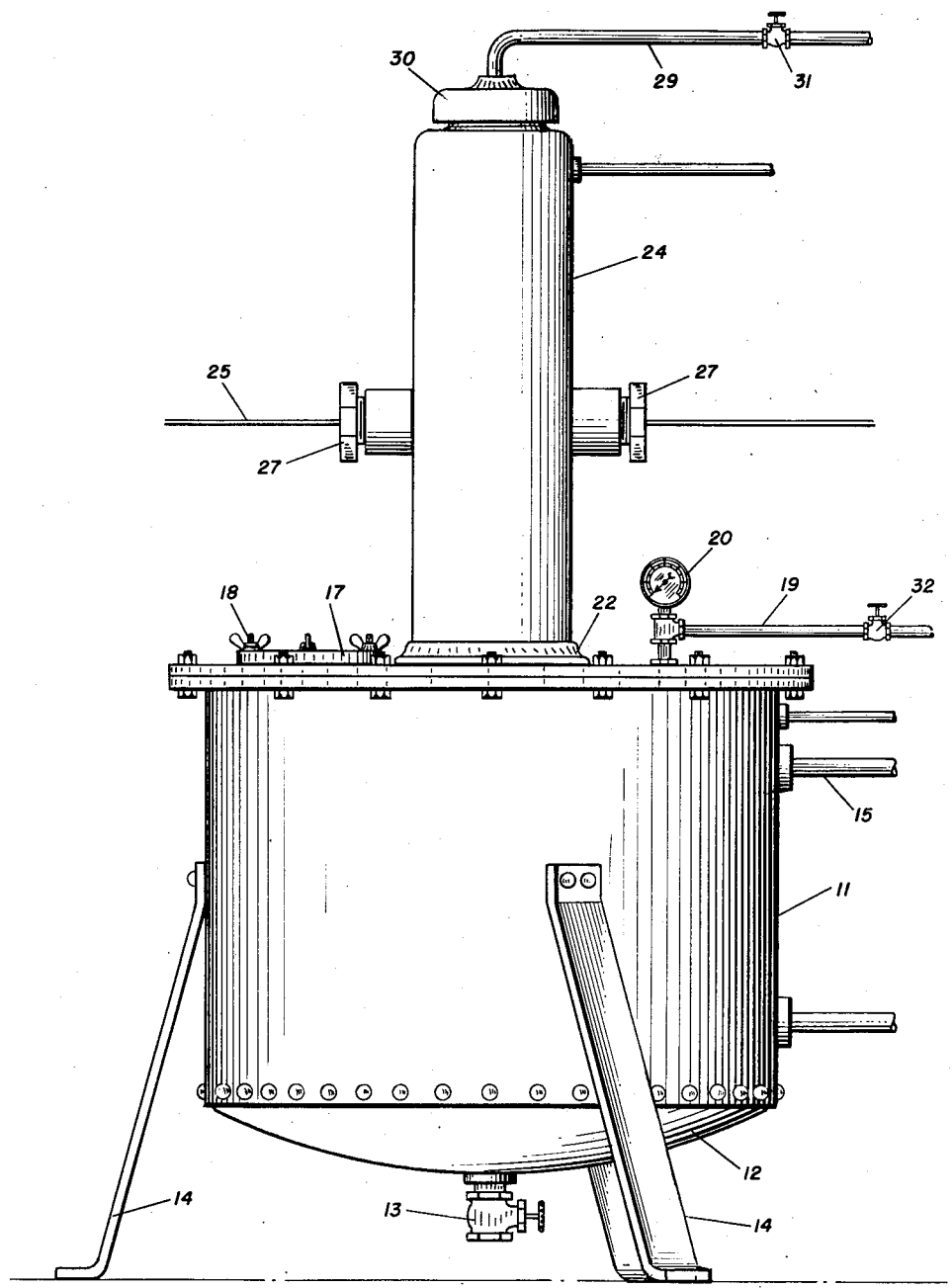
Figure 2 is an elevation of the apparatus shown in Figure 1.

Referring to the drawings, a tank 11 preferably made with a concave bottom 12 to permit ready drainage through the valve 13 is mounted in any suitable manner, as for example on the legs 14. The compound, whether bituminous or resinous in nature is maintained within the supply tank at a temperature slightly above its melting point by means of an appropriate heating medium, such as the steam coil 15 or, alternately, external gas heaters or electric strip heaters may be used for this purpose. The cover 16 of the tank is fitted with a removable plate 17, held in place with appropriate fastenings 18 which provide an easy means for introducing the compound, usually in the form of unmolten lumps.

In the embodiment shown, the compound is maintained under elevated pressure by means of compressed air or, in some cases where the extra expense is justified, an inert gas such as carbon dioxide if oxidation must be minimized. Whatever the nature of the gas, it may be admitted through the supply pipe 19 and a pressure gauge 20 is provided for control.

The cover 16 of the supply tank is fitted with a steam-jacketed, open-ended tube 21 which passes through the cover through a gas tight joint 22 and is of sufficient length to almost reach the bottom of the tank. The compound, under the influence of the pressure applied to it, is forced up the tube 21 to a height which will of course be governed by the intensity of the pressure.

For best results, it is generally necessary to apply the compound to the surface of the wire at a temperature considerably in excess of its melting point. This is desirable if a smooth finish and maximum penetration are to be obtained. It is for this reason that the upper portions of the tube 21, together with the extrusion head 23, are provided with a jacket 24 or other suitable heating means, so that the compound may be raised to the proper temperature for application, often at least 400° F. for those bituminous compounds which contain gilsonite or high melting asphalts.

In the form shown, the extrusion head 23 consists of a cross-shaped member which is fitted to the upper end of the tube 21 and which carries dies in two opposing arms that are maintained in position by locknuts 27. The wire or strand to be coated 25 passes through the entrance die 26, which is sufficiently tightly fitting to prevent the excess leakage of air into the extrusion head. Because of the motion of the wire which tends to draw the coating material away from the die there is no possibility of the compound leaking back between the die and the strand 25. The wire now passes through the body of the extrusion head which is filled with compound that is maintained considerably above its melting point by the steam jacket 24 as previously described.

In some cases it may be desirable to apply the compound under high pressure, something which has not been practicable with the usual type of finishing tank which operates entirely at atmospheric pressure. With the present design of applicator however, pressure upon the body of the compound in the storage tank may be of such a magnitude that the material at the extrusion head will be forced into the interstices of the strand 25 and not merely laid upon it as is the usual procedure. In any event, the excess compound is removed by the finishing die 28 which also serves to polish the coating and give the strand a smooth, glossy surface.

If it is thought desirable to maintain the body of compound in the supply tank at atmospheric pressure either to minimize oxidation or lighten the construction of the tank, a vacuum may be applied to the interior of the extrusion head through an appropriate line 29 which is fitted to the cap 30. If a vacuum rather than a positive pressure is maintained upon the extrusion head it will not of course be necessary to seal the cover of the supply tank as shown in the drawings and, in fact, this would tend to retard the flow of compound to the extrusion head.

Under certain circumstances the use of a vacuum may be a desirable feature as, for example, if the compound to be applied is of a type which contains a certain amount of volatile solvent. In such cases the vacuum line 29 is useful to withdraw the vapor which will be released under the elevated temperature and which may then be recovered by known methods.

Various methods of operating this apparatus will be apparent. For example, if the valve 31 is open so that the surface of the compound is merely under atmospheric pressure, the pressure of compound on the surface of the strand will be equal to the height of the column of molten compound times the weight of the compound. Negative pressures will be obtained at the extrusion head if the supply valve 32 is open and vacuum is applied through valve 31. High positive pressures limited only by the physical strength of the equipment, may be obtained by closing valve 31 and admitting gas through valve 32. In a similar manner the apparatus may be modified in many other ways, particularly as to the various heating means without departing from the invention as defined in the following claims.

What I claim is:

1. In apparatus of the class described, an extrusion head for the application of a molten compound to a strand, a storage tank containing compound maintained at a temperature above its melting point and means for raising the temperature of the compound during its passage from the storage tank to the extrusion head, said extrusion head being located above said storage tank.

2. In apparatus of the class described, an applicator for coating a strand with compound, a storage tank for the supply of compound, a body of compound maintained within said storage tank at a temperature above its melting point and means for transferring the compound to said applicator while increasing the temperature of said compound, said applicator being located at a greater elevation than the body of compound located in said storage tank.

3. The apparatus of claim 1, in which the interior of the storage tank is maintained at superatmospheric pressure.

4. The method of handling thermo-plastic coating compounds which comprises the steps of maintaining a body of compound at a temperature at least equal to the melting point of the compound, applying the compound to a strand at a temperature at least 100° F. higher than its melting point and raising the compound from the lower to the higher temperature while raising it to the point of application.

5. In apparatus of the class described, an extrusion head for the application of a molten compound to a strand, a storage tank containing compound maintained at a temperature above its melting point, means for transferring molten compound from the storage tank to the extrusion head, said extrusion head being located at a higher elevation than said storage tank, and means for raising the temperature of the compound in the extrusion head above the average temperature of the compound in the storage tank.

6. The apparatus of claim 5 in which the compound within the storage tank is maintained at a pressure greater than atmospheric.

7. In apparatus of the class described, an applicator for coating a strand with compound, a storage tank for the supply of compound, a body of compound maintained within said storage tank at a temperature above its melting point, means for maintaining the temperature of the compound within the applicator at a temperature higher than the temperature of the compound in the storage tank, means for raising the compound to said applicator, said compound being maintained at superatmospheric pressure, and a single connection between the storage tank and the applicator for the transfer of compound.

8. Apparatus for the application of a thermoplastic compound to a wire comprising a supply vessel, a body of compound maintained at a temperature above its melting point within said supply vessel, an applicator for applying the compound to a strand, means for transferring compound from said supply vessel to said applicator without permitting the return of compound from said applicator to said supply vessel, a heater for raising the temperature of the compound from its melting point to the temperature of application, and a second heater effective to maintain the compound in the applicator at a temperature higher than that of the compound in the supply vessel, the compound pressure being greater within said supply vessel than within said applicator.

9. The apparatus of claim 8 in which the body of compound in the storage tank is maintained at greater than atmospheric pressure.

10. The apparatus of claim 8 in which the temperature of the compound is raised as it is transferred to the applicator.

JOHN W. OLSON.